(12) United States Patent
Lai et al.

(10) Patent No.: US 7,581,221 B2
(45) Date of Patent: *Aug. 25, 2009

(54) SYSTEMS AND METHODS FOR SENDING COORDINATED NOTIFICATIONS

(75) Inventors: William Yanwah Lai, Bellevue, WA (US); Steven M. Liffick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

This patent is subject to a terminal disclaimer.

(21) Appl. No.: 11/091,850

(22) Filed: Mar. 28, 2005

(65) Prior Publication Data

US 2005/0219061 A1    Oct. 6, 2005

Related U.S. Application Data (62) Division of application No. 09/997,368, filed on Nov. 30, 2001, now Pat. No. 7,257,610.

(60) Provisional application No. 60/330,000, filed on Oct. 17, 2001.

(51) Int. Cl.
*G06F 9/46* (2006.01)
*G06Q 20/00* (2006.01)

(52) U.S. Cl. ................. 718/101; 719/318; 709/206; 705/67; 705/78

(58) Field of Classification Search ............. 707/102, 707/104.1; 705/27, 28, 67, 78; 709/206, 709/226; 718/101, 102; 719/315, 318; 726/5, 726/6

See application file for complete search history.

(56) References Cited

U.S. PATENT DOCUMENTS

| | | | |
|---|---|---|---|
| 5,384,697 A | 1/1995 | Pascucci | |
| 5,794,234 A | 8/1998 | Church | |
| 5,815,665 A | 9/1998 | Teper | |
| 5,974,085 A | 10/1999 | Smith | |
| 6,094,681 A | 7/2000 | Shaffer | |
| 6,389,538 B1 | 5/2002 | Gruse | |
| 6,425,016 B1 * | 7/2002 | Banavar et al. | 719/310 |
| 6,442,565 B1 * | 8/2002 | Tyra et al. | 707/102 |
| 6,466,969 B1 * | 10/2002 | Bunney et al. | 709/206 |
| 6,487,584 B1 * | 11/2002 | Bunney | 709/206 |
| 6,617,969 B2 | 9/2003 | Tu | |
| 6,633,910 B1 | 10/2003 | Rajan | |
| 6,704,772 B1 | 3/2004 | Ahmed | |

(Continued)

OTHER PUBLICATIONS

Gruber, R.E.; Krishnamurthy, B.; and Panagos, E.; The Architecture of the Ready Event Notification Service; AT&T Labs—Research; pp. 6.

(Continued)

*Primary Examiner*—Andrew Joseph Rudy
(74) *Attorney, Agent, or Firm*—Workman Nydegger (57) ABSTRACT

Systems and methods for delivering coordinated notifications to a user. Each entity that is involved in a transaction with a user generates notifications to update the user about the status of the transaction. The notifications are sent to a notification interface that is accessible by each entity. The notification interface sends the notifications to a router that delivers the notifications to the user according to user preferences, notification status, and user online status. The notifications each contain an identifier that enables them to be coordinated and delivered to the appropriate user.

22 Claims, 3 Drawing Sheets

U.S. PATENT DOCUMENTS

| | | | |
|---|---|---|---|
| 6,708,205 B2 | 3/2004 | Sheldon | |
| 6,721,713 B1 * | 4/2004 | Guheen et al. | 705/1 |
| 6,736,322 B2 * | 5/2004 | Gobburu et al. | 235/462.46 |
| 6,782,414 B1 | 8/2004 | Xue | |
| 6,795,967 B1 | 9/2004 | Evans | |
| 6,847,938 B1 | 1/2005 | Moore | |
| 6,934,760 B1 | 8/2005 | Westbrook | |
| 6,941,363 B2 * | 9/2005 | Ito et al. | 709/223 |
| 6,981,020 B2 | 12/2005 | Miloslavsky | |
| 6,990,471 B1 * | 1/2006 | Rajaram | 705/64 |
| 6,993,502 B1 * | 1/2006 | Gryglewicz et al. | 705/31 |
| 7,016,953 B2 | 3/2006 | Lemon | |
| 7,027,567 B1 * | 4/2006 | Scott et al. | 379/88.12 |
| 7,120,591 B1 * | 10/2006 | Solomon et al. | 705/14 |
| 7,149,698 B2 * | 12/2006 | Guheen et al. | 705/1 |
| 7,225,230 B1 * | 5/2007 | Knoerle et al. | 709/206 |
| 7,225,249 B1 * | 5/2007 | Barry et al. | 709/227 |
| 7,246,243 B2 * | 7/2007 | Uchida | 713/186 |
| 7,257,595 B2 * | 8/2007 | Verma et al. | 707/101 |
| 7,315,826 B1 * | 1/2008 | Guheen et al. | 705/7 |

OTHER PUBLICATIONS

Pardo-Castellote, Gerardo and Schneider, Stan; The Network Data Delivery Service: Real-Time Data Connectivity for Distributed Control Applications; Proceedins of the International Confrence on Robotics and Animation, IEEE; May 1994, pp. 7.

Notice of Allowance dated May 8, 2007 cited in related Patent No. 7,257,610.

* cited by examiner

SYSTEMS AND METHODS FOR SENDING COORDINATED NOTIFICATIONS

CROSS-REFERENCE TO RELATED APPLICATIONS

This application is a divisional of U.S. patent application Ser. No. 09/997,368, filed on Nov. 30, 2001 and entitled, "Systems and Methods for Sending Coordinated Notifications," which claims the benefit of U.S. Provisional Application No. 60/330,000, filed Oct. 17, 2001 and entitled "Systems and Methods for Sending Coordinated Notifications."

BACKGROUND OF THE INVENTION

1. The Field of the Invention

The present invention relates to systems and methods for sending coordinated notifications to a user. More particularly, the present invention relates to systems and methods for routing coordinated notifications to a user from each entity that is involved in a particular transaction with the user.

2. Background and Relevant Art

One of the advantages provided by the Internet is the ability to share information. Using tools such as email and instant messaging, users are able to interact and communicate with each other with relative ease. In fact, much of the communication and interaction that occurs on the Internet is user-to-user. The Internet or online presence of businesses, entertainment companies and other entities, however, is expanding and there is also a lot of communication and interaction that occurs between entities and users.

While businesses and entities also employ tools such as email in their communications with users, the interaction that occurs between entities and users is somewhat different from the interaction that occurs between users. For example, there is often some anonymity between the entities that provide content or data to users and the users that receive the content or data from the entities. In other words, some of the communication between these entities and their users is not necessarily unique with respect to a particular user in the sense that the identity of each individual user is often unknown to the entities.

Financial websites, for example, often provide stock quotes or interest rates to all users that request this type of data even though some of the users request quotes for different stocks or for different interest rates. In fact, some users indicate to these websites that they would like to receive notifications that indicate the current price of certain stocks. These websites know that they are providing customized content to different users but they may know very little about the users that receive the customized content.

Email is another example of online communication that demonstrates the anonymity that often exists between businesses and users. Many companies or businesses often send emails in mass, for instance, to as many different email addresses as possible. Even though each email is a business-to-user communication, there is no familiarity between the business and the email recipient and the business is often only aware of the user's email address. In fact, much of this type of email is often unsolicited and unwanted.

This anonymity is partially overcome by entities or websites that register their users. During registration, a user typically provides more detailed information about themselves to the website. When the user subsequently visits that website, the website is able to recognize that user when the user logs on (or via a cookie that is stored on the user's computer) and the content provided by that website is often customized for that user according to the information that was provided by the user. In this case, the interaction between the website and their registered users is more specific to each user, and the website is able to generate emails or other communications that are intended for certain users, even though the same or similar communications may occur with other users that have also registered with the same website.

Registration is also useful to many entities because the information provided by the user allows each entity to communicate with a user for a given transaction. Unfortunately, any given transaction that is performed on the Internet usually involves more than one business or entity. For example, an online bookstore is not the only entity that is involved in the transaction that occurs when a user purchases a book online. Other entities that may be involved in this transaction include both the company that ships the book to the user and the credit card company that allowed the user to charge the book at the online bookstore.

The shipping company and the credit card company, however, are not able to send information to the user that is tied to the original book purchase. In other words, the notifications that may be provided by these companies are not coordinated with the notifications that are provided by the original entity. The credit card company, for example, may be able to notify the user that a charge has been made to their account, but it is much more difficult to notify the user that their card was charged for the book that they purchased from the online bookstore and the credit card company may not know the best way notify the user for that transaction. Similarly, the shipping company may be able to inform the user that a package will be delivered, but the shipping company cannot identify the contents of the package being sent.

The inability to provide coordinated notifications from multiple entities results in ineffective communication with the user about the transaction. The notifications are not coordinated or related, for example, because the credit card company and the shipping company may not have access to the user's email address or because they are not directly involved in the part of the transaction that the user initiated with the online bookstore. Alternatively, the user may not have registered with the credit card company or the shipping company as the user did with the online bookstore. For these and other reasons, these companies cannot effectively provide coordinated notifications to the user regarding this particular transaction.

The inability of these entities to provide coordinated updates or notifications to a user regarding a particular transaction is part of another problem that is associated with transactions that occur over the Internet. When a user executes an online transaction, such as purchasing a book from an online bookstore, the user does not experience complete satisfaction. If the user purchases the book at a regular brick and mortar bookstore, they experience immediate satisfaction because they leave the bookstore with their newly purchased book and they can begin reading the book without delay. In contrast, a user that purchases the same book from an online bookstore does not experience this satisfaction. The user is required to wait until their book arrives.

As long as the user has provided sufficient information to the online bookstore, the online bookstore is able to provide some satisfaction to the user by generating communications to the user that indicate, for example, that the book is being packaged or that the book has been shipped. After the book has left the online bookstore, however, the user will no longer receive coordinated updates or notifications from the other entities involved in this transaction. For any given transaction that involves more than one entity, users or consumers are unable to receive notifications that cover the transaction from beginning to end in a coordinated fashion.

SUMMARY OF THE INVENTION

These and other problems are overcome by the present invention, which provides systems and methods for providing users with coordinated notifications from the beginning of a transaction to an end of the transaction. Each entity or business involved in a particular transaction can generate notifications that are coordinated with other notifications and can be appropriately routed to the user for a given transaction. The present invention allows for each entity to generate notifications and for delivering coordinated notifications, but the decision to generate a notification is dependent on the various entities involved in the transaction. A user receives notifications from those entities that choose to generate notifications.

There are two fundamental stages of delivering notifications to a user. The first stage is related to notification generation and the other stage is related to notification delivery. With respect to the notification generation, a notification interface is provided that is able to communicate with each of the entities that may be involved in a transaction and the notification interface can accept a notification from each of those entities over a network such as the Internet. The entities involved in the transaction are able to track a user using an identifier such as a user identifier or a subscriber identifier that uniquely identifies the user to each entity. Each notification generated by the various entities typically includes the user identifier and each notification is sent to the notification interface. The notification interface thus receives coordinated notifications from multiple entities.

The notification interface provides each notification to a router that is responsible for delivering the notification to the user. The router has access to a database of user preferences that is consulted by the router in order to determine how to best deliver the notification to the user. The router also takes into account the various devices through which the user may receive a notification, characteristics or priority of the notification, and the like when determining how to deliver the notification. Thus, each notification is delivered to the user by a router that selects a device and/or a delivery for each notification.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many companies are conducting business online and for any particular transaction, a user will often interact with more than one company. For example, when a user purchases an item, the user first interacts with the company or entity that sold the item. The user may also interact with both the credit card company and with the shipping company, although the interaction between these other companies and the user may be indirect. Each separate company plays a role in the transaction that was initiated when the user bought the item from the first company.

The present invention relates to systems and methods that allow multiple companies to provide coordinated notifications to a user that are related to a particular transaction from the beginning of the transaction to the end of the transaction. This allows a user or a set of users to receive notifications from multiple entities that update the status of one transaction instead of receive notifications that are disjointed and seemingly unrelated. The present invention, however, does not require that each entity involved in the transaction generate or send a notification to the user.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
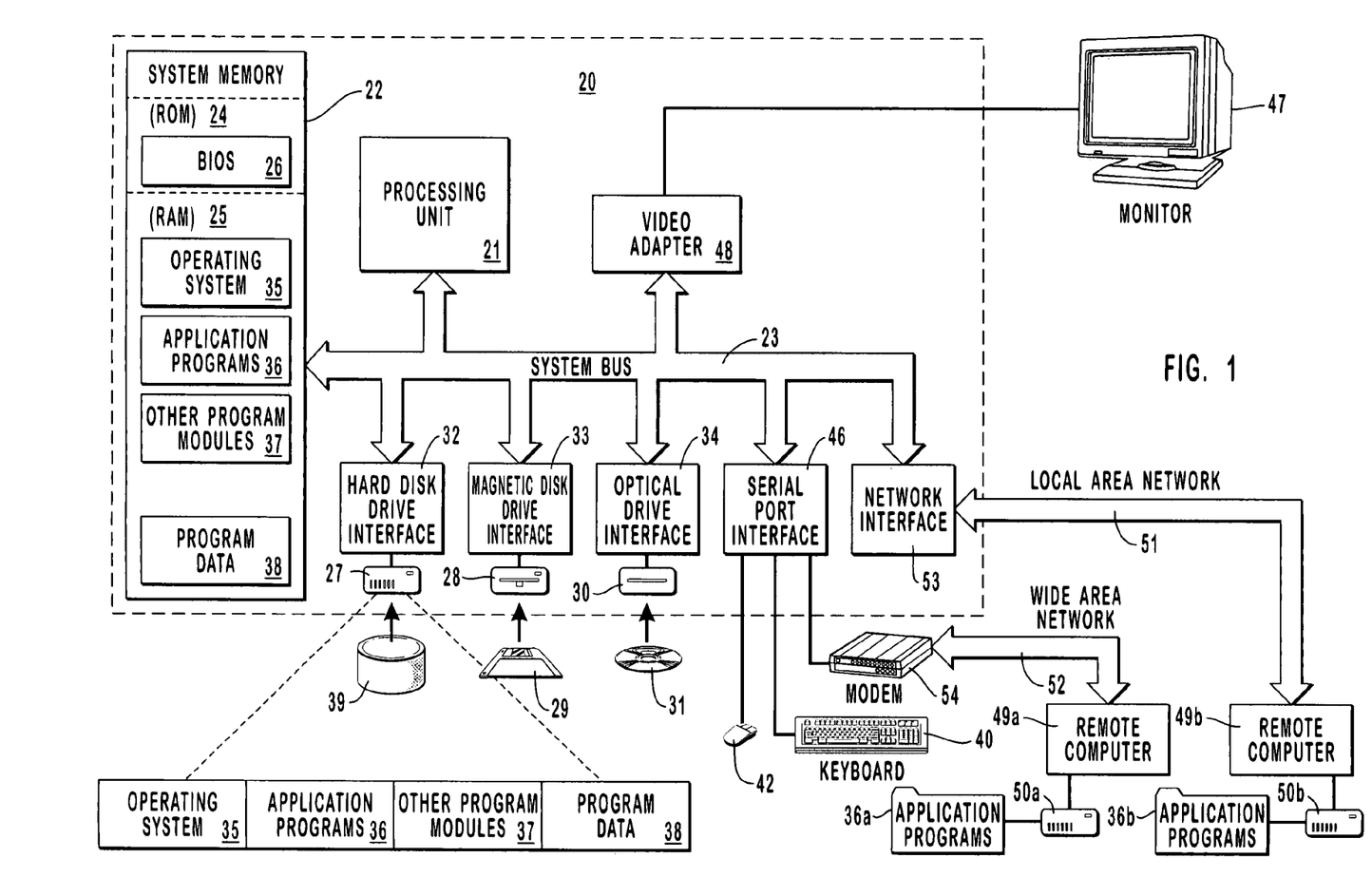
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote a computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

As used herein, "entity" refers to any individual, group of individuals, business, company, organization, website, software application and the like that desires to send a notification to a user or to a set of users. The terms "company," "business," and "entity," are often used interchangeably. Similarly, a user may also refer to any individual, group of individuals, business, company, organization, website, software application, and the like that receives a notification. A "notification," as used herein, refers to the information or data that is generated by an entity and sent or transmitted to the user and that updates the user about a transaction or provides a status of the transaction. In addition to providing a transaction update, the notification, in some instances, enables the user to take action regarding the transaction. A transaction, as used herein, is not limited to a purchase of a good or service, but includes situations where multiple entities desire to send notifications to a user or to a set of users. For example, a group of entities that desires to send consecutive emails to a particular user is within the scope of a transaction.

Figure 2:
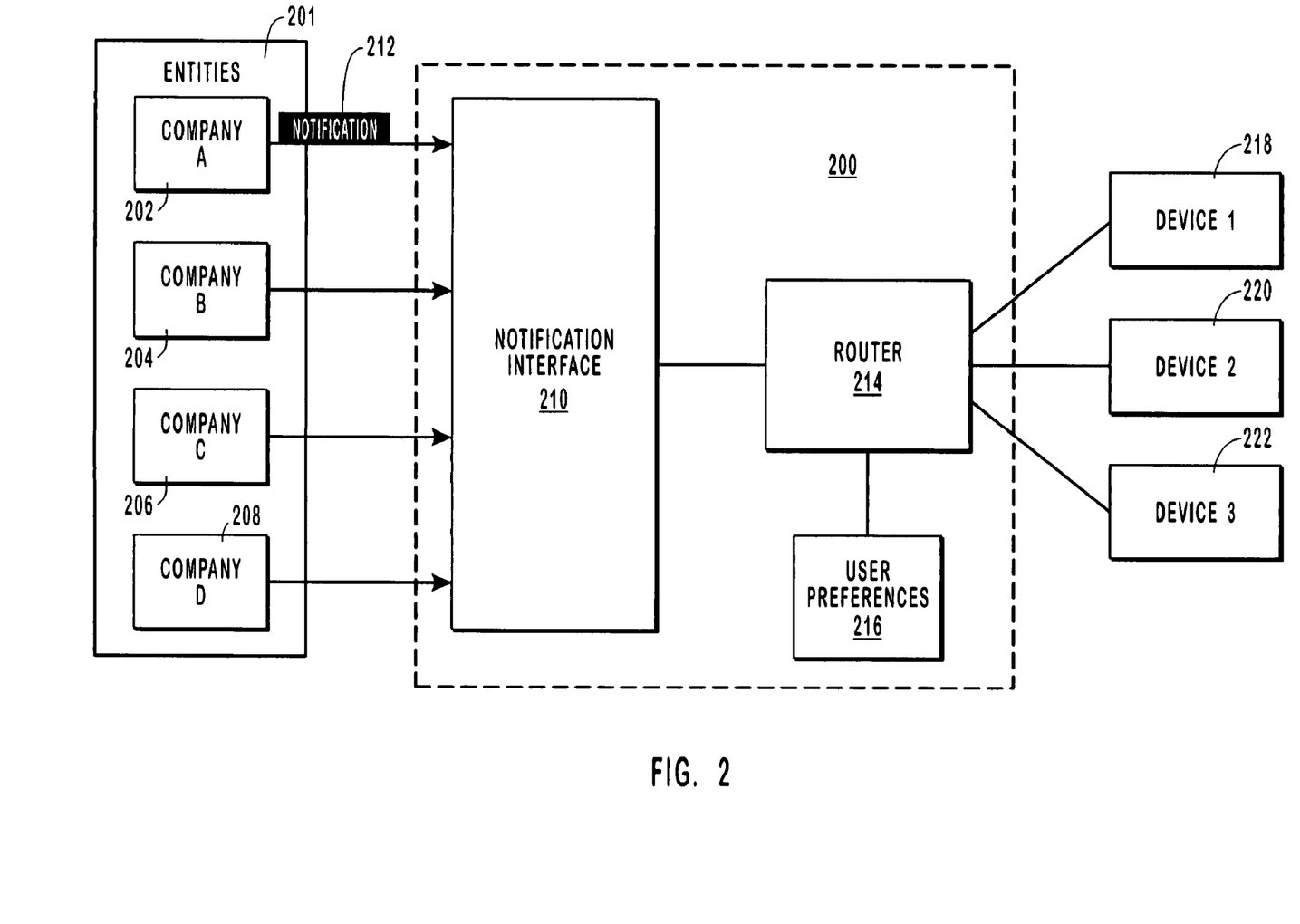
FIG. 2 is a block diagram that illustrates a notification system that is able to receive notifications from multiple entities and route the notifications to a user.

FIG. 2 is a block diagram that illustrates an exemplary system for delivering multiple notifications from multiple entities to a user. More specifically, FIG. 2 is a block diagram that illustrates an exemplary notification system 200 for sending coordinated updates or notifications regarding a particular transaction from multiple companies that are involved in the transaction to a user or consumer. The example of FIG. 2 includes one or more entities 201 that may generate or create a notification that updates a status of the transaction for a user. The update or status provided in the notification is usually related to the portion of the transaction that is specific to the entity or company that generated the notification. The entities 201 in this example are illustrated as company A 202, company B 204, company C 206 and company D 208. The notification system 200 includes a notification interface 210 that receives the notifications generated and sent by the various entities 201.

The notification system 200 allows the entities 201 to send notifications for a transaction to a user such that the user is updated about the status of a particular transaction and receives coordinated notifications from the entities 201 from the beginning of the transaction to the end of the transaction. Previously, updates to a user about a particular transaction would cease as soon as the first company fulfilled their role in the transaction. The present invention overcomes this limitation and allows coordinated notifications from subsequent companies involved in the transaction to be sent to the user. The notification system 200 is also responsible for delivering the notifications to the user with a router 214.

The following scenario is used to illustrate how the notification system illustrated in FIG. 2 may be used to deliver coordinated notifications to a user from each of the entities 201 involved in a transaction. In some instances, some of the entities may not generate and send a notification to the user. In these situations, the user will still receive notifications from those entities that choose to generate and send notifications to the user.

The entities 201 or companies used in this example are a consumer electronics website represented by company A 202, a credit card company represented by company B 204, a shipping company represented by company C 206, and a consumer electronics manufacturer represented by company D 208.

All notifications generated by the various companies involved in this example are sent to the notification interface 210. The notification interface 210 provides a common interface to each of the entities 201 such that the notifications generated by each entity can be standardized. In one example, the notification interface 210 provides an applications programming interface (API) to the entities 201 and the entities 201 transmit their notifications through the API. In another example, the notification interface 210 is accessible over a network such as the Internet. The content of the notifications is usually determined by the entity that generates and sends the notification to the user through the notification interface 210.

For example, assume that a user decides to purchase a personal digital assistant (PDA) from company A 202, which sells consumer electronics. The user first accesses the website of the company A 202. If the user has never been to the website of company A 202 before, the user will be likely be required to register with the site, especially if a purchase is being made, and the user will typically supply personal information such as their name, address, shipping address, credit card information, and the like to the website. The extent of the information provided by the user is sometimes dependent on the activities of the user at the website. Thus, credit card information is usually only supplied if a purchase is being made while other users can often browse the website without providing any data to the website.

After the user is registered with the website of the company A 202 (although registration is not a requirement of the present invention), the user will be provided with a user identifier that can be used to access the website on subsequent occasions. The user identifier may include, for example, a user name and/or password.

Some websites or entities have an association or agreement with an external authentication service or website that authenticates the user to the website. The authentication service may, for example, provide a unique user identifier to the company that uniquely identifies the user. In some instances, the user is not aware of the unique user identifier. In this case, the user can access the website of the company A 202 using the user identifier issued by the authentication service (such as Microsoft Passport™) and the website of company A 202 will accept the user identifier issued by the authentication service. The user identifier is often accompanied by a user profile that may include personal information of the user, such as email address, telephone number, mailing address, and the like. One advantage of using the authentication service is that the same user identifier can uniquely identify the user to more than one entity.

A user identifier that uniquely identifies a user to multiple web sites or entities is advantageous because it enables subsequent companies to more easily identify the user that is involved in a particular transaction. However, the present invention does not require the user to utilize the external authentication service or have a user identifier that is valid at multiple web sites. The user can be authenticated by the notification system, by one or more of the entities involved in the transaction or by other methods known in the art.

In this example, the user logs on to the website of company A 202 and is redirected to the authentication service, which validates the credentials of the user. An encrypted user identifier is returned to the user and forwarded to the company A 202, which can decrypt the user identifier. After the user has accessed the web site and purchased the PDA, the website of the company A 202 begins to generate notifications that are sent to the notification interface 210. As will be described later, the notification interface 210 forwards all notifications to a router that delivers the coordinated notifications to the user. The notifications may indicate, for example, that the user has just purchased a PDA, that the PDA is in stock, that the user will be informed when the PDA is shipped, and the like. Each company will typically use the notifications to inform the user about the status of their transaction and the notifications generated by the various companies are usually specific to their respective roles in the transaction.

Next, the company A 202 uses, for example, the user's credit card information to charge the purchase. If the user signed in to the website of company A using the authentication service, then the credit card information can be automatically provided to the company A 202 from the authentication service without input from the user because this information is often stored by the authentication service. As the company A 202 charges the purchase amount of the PDA to the user's credit card, the company A 202 provides the credit card company or the company B 204 with the user identifier and/or the user profile. The company A 202 can also provide other information about the purchase to the company B 204 such as name, address, purchase price, purchased product, and the like. With this information, the company B 204 is able to generate a notification to the user that indicates that a charge has been made to the user's credit card. Depending on the information provided by the company A 202, the company B 204 could also inform the user about what was purchased by the user. This notification sent by the company B 204 is also delivered to the notification interface 210. Thus, the company B 204 is able to provide the user with notifications that are coordinated with the notifications generated and sent by the company A 202.

Meanwhile, the company A 202 has prepared the PDA for shipping and generates a notification to the user regarding this fact. The company A 202 next communicates with the shipping company or company C 206 to actually arrange the shipping of the product to the user. The company A 202 typically shares the same information with company C 206 as it shared with company B 204. However, some of the information may differ as the company C 206 has a different role in the transaction than the company B 204. Using this information, the company C 206 generates a notification to the user that the PDA is ready to ship, that the PDA is en route, and the like.

More specifically in one example, the user identifier supplied by the company A 202 enables the company C 206 to determine or identify the user to whom a notification is sent. The company C 206 will continue to generate notifications as it deems necessary as the product is being shipped. For instance, the company C 206 can generate notifications that inform the user where the PDA is located or when the PDA will arrive. Alternatively, the notifications generated by the entities can simply include the user identifier and the notification interface or the notification delivery system is responsible for delivering the notification to the proper user. The identity of the user may be determined from the user identifier.

Next, the company A 202 might communicate with the manufacturer or company D 208 and inform them that one of their products has been sold. This allows, for instance, the company D 208 to generate a notification to the user that congratulates them on their purchase and offers them the ability to register their product. In this manner, a user is continually notified or updated about the status of the PDA that they purchased from the companies involved in this transaction.

The user will receive coordinated notifications about all aspects of their purchase or transaction as they happen and each company is aware that they are sending notifications for a particular transaction. The notification system 200 thus enables multiple companies to send coordinated notifications to a user about the transaction even though each individual company is only involved in a portion of the transaction. As previously discussed, some entities may not send notifications to the user through the notification interface 210. This action on the part of a particular entity does not prevent other entities involved in the transaction from generating and sending notifications to the user via the notification interface 210. Each notification received at the user interface will be delivered to the user.

More generally, the entities only need the user identifier in order to generate coordinated notifications. Because the notification sent to the notification interface 210 includes the user identifier, the notification interface 210 and/or the router 214 is able to determine the identity of the user. The notifications are coordinated and are all delivered to the user by the router 214. Thus, a user identifier that is issued by an authentication service allows the notifications that are received by the notification interface 210 to be delivered to the appropriate user.

The present invention has been described using a user identifier as an example of uniquely identifying and/or authenticating a user, but other identifiers may be used. For instance, an entity may create a subscription with the notification system 200 and the notification system will provide a subscription identifier to the entity. When the first entity communicates with other entities, the subscription identifier is supplied to those entities. When notifications are submitted to the notification system 200 by the other entities, they will include the subscription identifier and the notification system will still be able to route these notifications to the appropriate user. Thus, entities can send coordinated notifications to a subscription identifier without having to know the user identifier.

A notification 212 includes several fields that are used to convey information about the transaction. An exemplary notification includes, but is not limited to, the following fields: an identifier field; a content field; an action field; a priority field; a category field; and an authenticate field.

The identifier field usually stores an identifier such as a user identifier or a subscription identifier and the identifier field allows the notification interface 210 and/or the router 214 to ascertain or identify the user that should receive the notification. The user identifier, for example, allows the router 214 to ascertain the email address of the user if the notification is to be delivered using email. The user identifier enables the router 214 to access data that is used to determine how to deliver the notification.

The content field typically contains the text or the message that has been generated from an entity or company. In the previous example where a user purchased a PDA, the content field may contain text that indicates that the PDA has been shipped, or that the user's credit card had been charged, or that the product has been backordered, etc. The content included in the content field of the notification 212 is the information, update or status of the transaction that the company desires to convey to the user.

The action field enables a user to take further action regarding a particular transaction and often contains a uniform resource locator (URL). For example, the content field of the notification may inform a user that their purchase will be delivered on a certain day. The URL provided in the action field of the notification may be a link to a website that allows the user to change the date of delivery. If a notification is used to notify a user that they have been outbid on an item being sold through an online auction, the action field may contain a URL that will take the user to a web page where the user can enter another bid on the item being auctioned. The action field of the notification thus enhances the transaction by providing additional functionality for both the company sending the notification and the user receiving the notification. The action field can also take the user out of the context of the notification system.

The priority field can indicate the importance of the notification, for example, and is often used to determine how the notification is delivered to a user. If a notification has high priority, for example, it may be important to ensure that the user receives the notification as soon as possible. The priority field is usually used to determine how urgent a notification is and can therefore affect how the notification is delivered. The priority field can also be a factor in determining how persistent the notification system should be in delivering or routing the notification to the user. For instance, the priority field determines whether the notification system attempts to deliver the notification until it is delivered or for a few hours, and the like.

The category field of the notification can be used to identify the type of transaction. For example, if the notification 212 is a financial notification, the category field can be used to indicate that the notification 212 should be encrypted such that any financial data included in the notification is protected from unauthorized parties. The category field may also affect notification delivery by providing, for example, higher urgency to certain categories. An appointment category, for instance, may have more urgency that a product shipped category. In this example, the appointment notification may be sent to a cell phone or a PDA while the product shipped notification may be sent only to an email address since it is less interesting than the appointment category.

The authenticate field is used to authenticate the identity of the company generating and sending the notification. This ensures the notification interface 210 and the user that they are actually receiving a notification from the entity that purports to send the notification. The authenticate field of the notification also helps prevent other entities from sending notifications to a user that may contain fraudulent and/or potentially damaging information.

The notification interface 210 is typically responsible for authenticating the entity that generated and sent a notification. The authenticate field, for example, could contain a digital certificate of the company that is verified by the notification interface 210. Alternatively, the identity of the company or the authenticity of the notification 212 can be determined independently of the notification 212, which would eliminate the authenticate field from the notification. For example, the identity of a particular company could be verified and authenticated as the company is generating and sending a notification to the notification interface 210 in the same way that a user is verified when they log on to a website using their user identifier.

When a notification 212 is received by the notification interface 210, the notification interface 210 sends or forwards the notification to a router 214, whose function is to deliver the notification to the user. The router 214 delivers the notification 212 to a user using information from one or more sources.

One source of information is a database that stores user preferences 216. The user preferences 216 can include information, for example, indicating that the user prefers to receive their notifications at a certain email address or that the user prefers instant messaging. Alternatively, the user can indicate that during certain hours, notifications are to be delivered to their cellular telephone.

FIG. 2 illustrates a device 218, a device 220, and a device 222. These devices represent the various devices over which a notification may be received and include, but are not limited to, desktop computers, cellular telephones, pagers, personal digital assistants, Internet terminals, facsimile, and the like or combinations thereof. The user preferences 216 can include information about the devices that a particular user has for receiving notifications.

The user preferences, in addition to being supplied by the users, can be inferred from, for example, online calendars, learned behaviors, and the like. For example, a user may purchase an airplane ticket online. The airline may send a notification to the user indicating that the flight has been delayed. From the user's online calendar, the router 214 determines that the user has a meeting that, because of the flight delay, will be missed. In this case, the router 214 may cause the notification to be delivered in the quickest manner such that the user may handle the situation.

Another source or type of information that the router 214 uses to make decisions is related to presence or status information. For example, the router 214 may be able to determine if the user is online, in which case the notification may be sent as an instant message. The router 214 is thus responsible for determining how the notification is sent to the user, after examining the user preferences 216, the devices that the user has for delivery of notifications, the category and/or priority of the notification, and the like. The router 214 will thus use filters, priority rules and fields, category fields, calendar data, time of day, presence information, device information, and the like to appropriately route notifications to a user.

Figure 3:
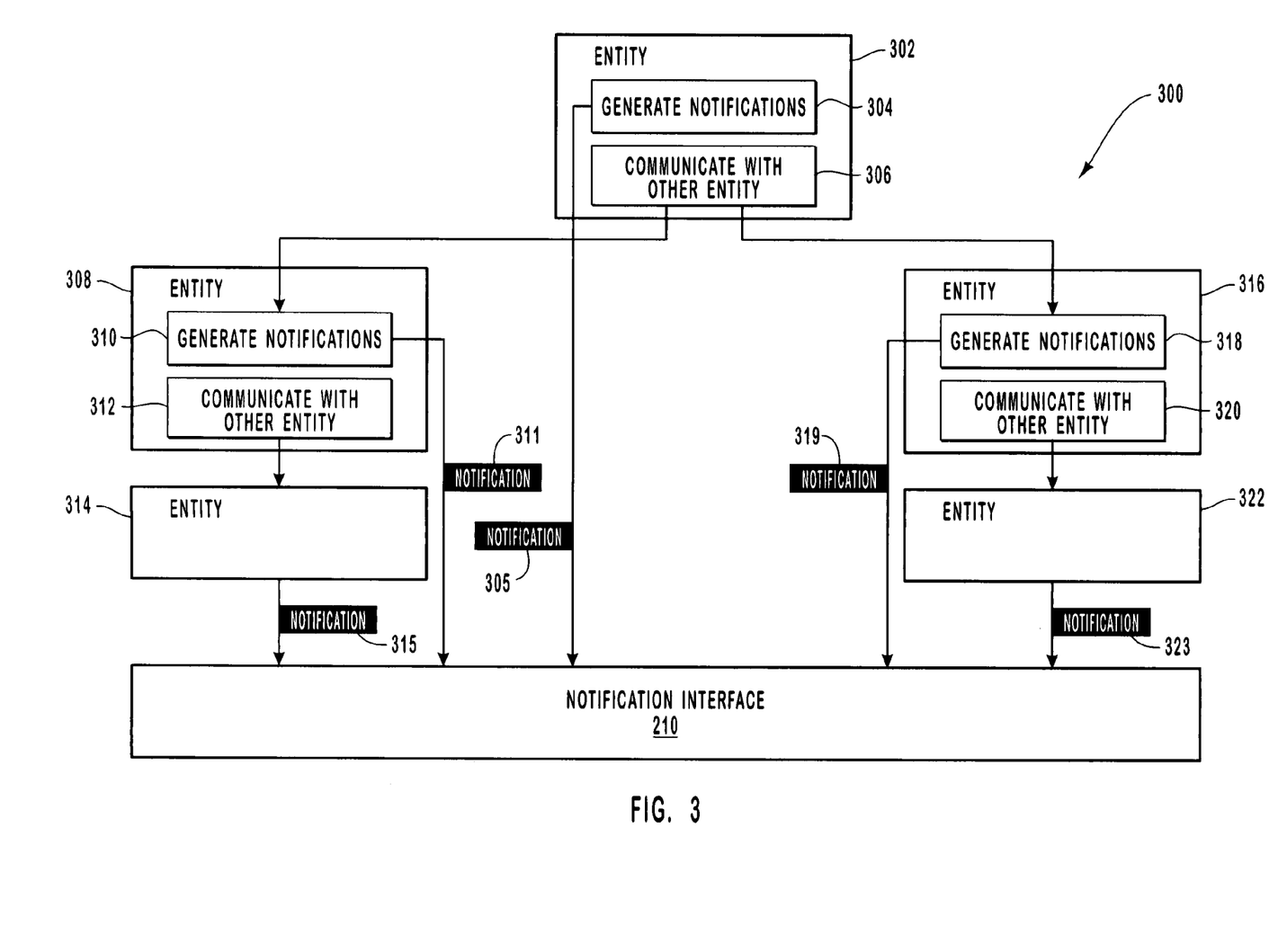
FIG. 3 is a block diagram that more fully illustrates coordinated notifications that are generated for a user for a particular transaction.

FIG. 3 is a block diagram that more fully illustrates the coordinated notifications that are delivered to a user during the course of a transaction as well as the exemplary relationships between various entities. In FIG. 3, this example of a user's transaction begins with entity 302. The entity 302 generates a notification (304) for those aspects of the transaction that are related to the entity 302. These notifications, represented by the notification 305, are sent to the notification interface 210 and the notifications are delivered to the user as previously described.

During the course of the transaction in this example, the entity 302 has cause to communicate with the entities 308 and 316. The entity 308 thus generates notifications (310) that are represented by the notification 311 for those aspects of the transaction that are related to the entity 308. In the communication between the entity 302 and the entity 308, the entity 302 provides the entity 308 with information, such as a user identifier or a subscription identifier that is used as the entity 308 generates notifications that are coordinated with the notification generated by the entity 302.

Similar communications occur between, in this example, the entity 308 and the entity 314, the entity 316 and the entities 308 and 322. Each entity typically generates notifications that are specific to their role in the transaction that was initiated by the user with the entity 302. Thus, the entity 314 generates a notification 315, the entity 322 generates a notification 323, etc. The notifications generated by the various entities, 302, 308, 314, 316, and 322 are all directed to the notification interface 210, that is accessible by all entities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A computer program product comprising one or more storage media for use in performing a transaction with multiple entities, wherein the multiple entities generate notifications that update a status of the transaction for a user, and for coordinating the notifications that are generated by the multiple entities and sent to the user, the computer program product comprising:

storage media storing computer-executable instructions, which when executed, implement a method comprising the following:

providing a notification interface, wherein the notification interface includes a standardized application programming interface (API) for each of the multiple entities to send notifications to a user, wherein the notification interface is enabled to send notifications to a user from multiple entities involved in a particular transaction with the user, and wherein each of the multiple entities that generates a notification corresponding to the transaction is enabled to communicate with the notification interface in order to send notifications to a user corresponding with the particular transaction and in a coordinated manner;

receiving, at the notification interface, notifications sent from the multiple entities, the notifications corresponding to the particular transaction, wherein each of the notifications comprises an identifier that enables the notification interface to uniquely identify the user and includes data identifying the particular transaction;

identifying the user from the identifier such that each notification may be sent to the user; and the notification interface sending the notifications to a router, wherein the router upon receiving the notifications determines how to deliver the notifications to the user by consulting preferences set by the user and by selecting from a plurality of different delivery methods specified by the user preferences as available for delivering notifications to the user, and such that each of the notifications corresponding to the particular transaction with the user are ultimately sent to the user in a coordinated manner.

2. The computer program product as defined in claim 1, wherein the API is a common interface through which each of the multiple entities transmit their notifications.

3. The computer program product as defined in claim 1, wherein the act of receiving notifications from each of the multiple entities that generated a notification at the notification interface further comprises an act of authenticating each of the multiple entities that sends a notification to the notification interface.

4. The computer program product as defined in claim 1, wherein the method further comprises: receiving, by at least one of the multiple entities, the identifier from the user; and accessing the at least one of the multiple entities using an authentication service that authenticates the user.

5. The computer program product as defined in claim 1, wherein the notification comprises one or more of: an identifier field that contains one of a user identifier or a subscription identifier; a content field that contains a status of the transaction; an action field that contains an object, wherein the object is a URL; a priority field indicating a priority of the notification; a category field indicating a category of the notification; and an authenticate field that allows a sender of the notification to be authenticated.

6. The computer program product as defined in claim 5, wherein the method further comprises determining how to deliver the notifications to the user by consulting preferences set by the user and one or more of: user devices, presence information of the user, the priority field of the notification, or the category field of the notification.

7. The computer program product as defined in claim 6, wherein the act of sending the notifications to the user further comprises an act of identifying the user from the user identifier or the subscription identifier.

8. The computer program product as defined in claim 7, wherein the method further comprises delivering, by the router, the notifications to the user.

9. The computer program product as recited in claim 1, wherein the notification includes content that updates the user about the transaction, and wherein the method further includes:
sending each notification to the user according to the determined delivery method determined by the router.

10. The computer program product as defined in claim 1, wherein the method further comprises an act of the notification interface identifying the user from the authentication service using the user identifier.

11. The computer program product as defined in claim 1, wherein the method further comprises an act of the router identifying the user from the authentication service using the user identifier.

12. The computer program product as defined in claim 5, wherein the act of consulting, by the router, preferences set by the user further comprises an act of the router consulting the category and the priority included in the notification to determine a delivery method of the notification.

13. The computer program product as defined in claim 1, wherein the notification further comprises: a category and a priority of the transaction; an action field that permits the user to take an action regarding the transaction; and an authenticate field that enables the notification interface to authenticate the entity that generated the notification.

14. The computer program product as recited in claim 1, wherein the notifications include a plurality of notifications, each of the plurality of notifications being received from a different one of the multiple entities.

15. The computer program product as recited in claim 1, wherein the notifications are standardized by the API prior to being sent to the user.

16. The computer program product as recited in claim 14, wherein the method further includes at least one of the multiple entities passing the identifier to at least one additional entity of the multiple entities, prior to the at least one additional entity sending a notification to the notification interface.

17. The computer program product as recited in claim 1, wherein the router determines which of a plurality of user devices to send the notifications to, the plurality of user devices including at least one of a desktop computer, cellular telephone, pager, personal digital assistant, internet terminal, or facsimile.

18. The computer program product as recited in claim 1, wherein the notifications are a plurality of notifications that cover the transaction from beginning to end in a coordinated fashion.

19. The computer program product as recited in claim 1, wherein the same identifier is used by each of the one or more multiple entities.

20. The computer program product as recited in claim 1, wherein each notification comprises each of:
an identifier field containing at least one of a user identifier or a subscription identifier;
a content field containing a status of the particular transaction from one or more of the multiple entities;
an action field containing an object enabling the user to take further action regarding the particular transaction;
a priority field indicating the importance of the notification;
a category field indicating the type of transaction; and
an authenticate field for authenticating an entity that sends or generates the notification.

21. The computer program product as recited in claim 1, wherein the preference are inferentially set by the user.

22. The computer program product as recited in claim 1, wherein the storage media is system memory and wherein the computer program product comprises a computer system having a processor.

* * * * *